United States Patent [19]

Ahonen et al.

[11] 4,096,045

[45] Jun. 20, 1978

[54] PROCESS FOR THE RECOVERY OF LEAD FROM LEAD SCRAPS

[75] Inventors: Heikki Ahonen, Valkeakoski; Jari Lindroos, Helsinki; Veli Sarkkinen, Tampere, all of Finland

[73] Assignee: Lyijyvalkoistehdas Gronberg Oy - Blyvittfabriken Gronberg AB, Vantaa, Finland

[21] Appl. No.: 780,824

[22] Filed: Mar. 24, 1977

[30] Foreign Application Priority Data

Mar. 25, 1976 Finland .................................. 760814

[51] Int. Cl.² .............................. C25C 1/18; C25C 1/00
[52] U.S. Cl. ..................................... 204/117; 204/114; 423/94
[58] Field of Search ............... 204/114, 117, 115, 140, 204/146; 423/94, 98

[56] References Cited

U.S. PATENT DOCUMENTS

| 1,752,356 | 4/1930 | Smith | 204/116 |
|---|---|---|---|
| 1,911,604 | 5/1933 | Calbeck | 204/114 |
| 3,477,928 | 11/1969 | Coltrinari | 204/107 |
| 3,985,630 | 10/1976 | Ginatta | 204/114 |
| 4,011,146 | 3/1977 | Coltrinari | 204/111 |

Primary Examiner—T. M. Tufariello
Attorney, Agent, or Firm—Jay L. Chaskin

[57] ABSTRACT

A process for the recovery of lead from battery scraps by mixing the lead scraps at elevated temperature with an aqueous solution of an alkali metal chloride and hydrochloric acid in order to dissolve, in the form of lead chloride, the lead compounds present in the lead scraps, separating an aqueous solution of this lead chloride from insoluble hard lead, which is recovered, crystallizing lead chloride from the cooling aqueous solution, which is separated from the lead chloride crystals, and finally subjecting the obtained lead chloride to electrolysis for the recovery of metallic lead.

18 Claims, 1 Drawing Figure

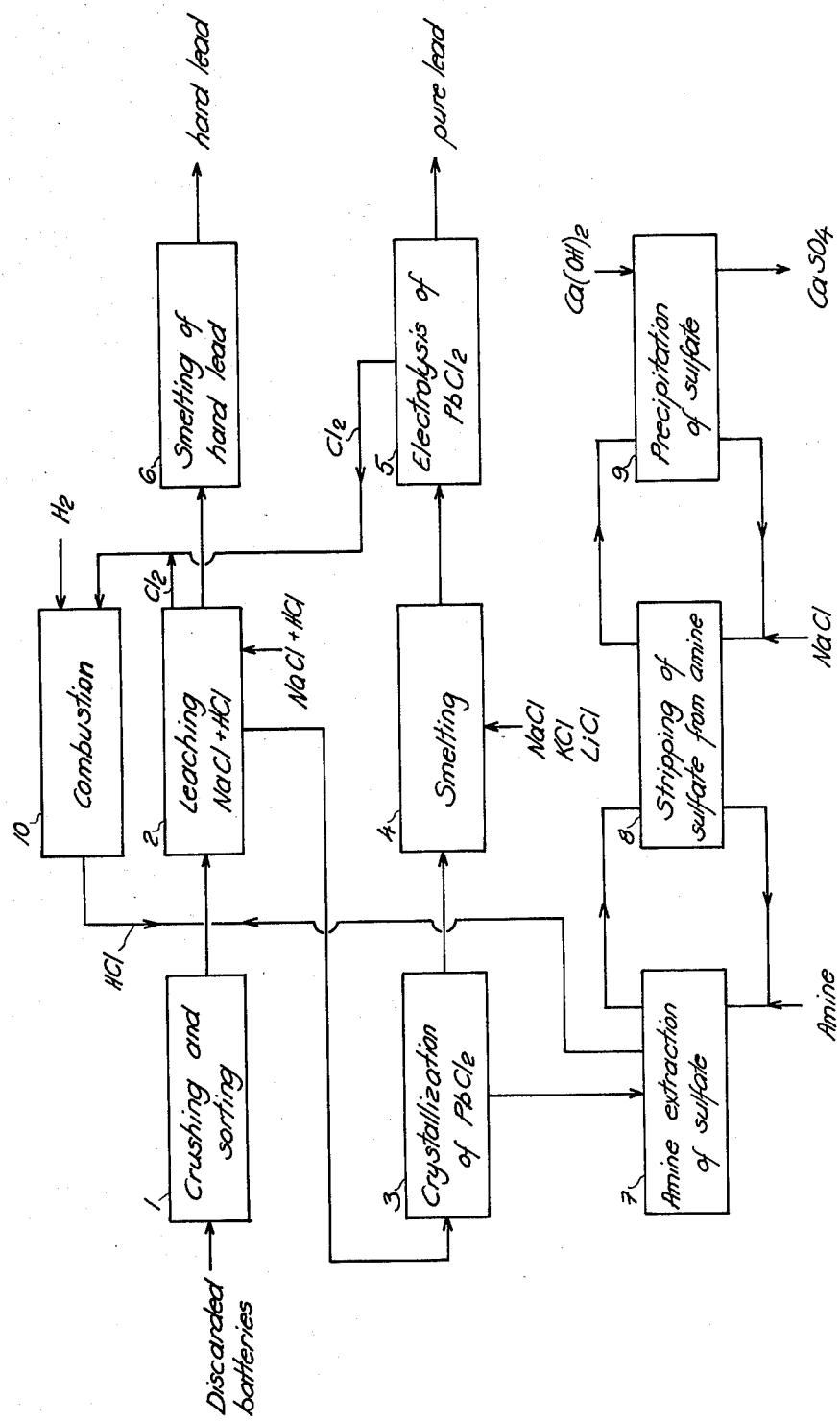

PROCESS FOR THE RECOVERY OF LEAD FROM LEAD SCRAPS

BACKGROUND OF THE INVENTION

The present invention relates to a process for the recovery of lead from lead scraps, such as discarded batteries.

The most common form of scrap lead is that contained in discarded batteries. This scrap has usually been treated pyrometallurgically, by roasting the lead sulfate present in the scrap into oxides and by reducing the obtained oxide into metallic lead, at a temperature of approx. 800° C in a shaft furnace with the aid of carbon and carbon monoxide. In the said process the sulfur dioxide reduced from the lead sulfate plus relatively large amounts of metallic lead are removed along with the flue gases. For the above reasons the said flue gases have to be treated in gas washers, with which most of the sulfur dioxide and metallic lead can be recovered but a complete purification cannot be achieved. This recovery of the lead compounds removed along with the flue gases is described in German Pat. No. 1,937,323, in which chlorine-bearing lead gases are washed by means of a sulfate solution. The washing and filtration of the flue gases is extremely expensive no matter which basic process is used for treating the lead pyrometallurgically, and all of the lead can never be recovered from these gases.

Pyrometallurgical processes have a further disadvantage in that the separation of lead from its natural impurities is difficult; in molten state it requires the use of various oxidizing chemical and the skimming of impurities in slag form from the surface of molten lead, the slag carrying a substantial part of the lead along with it. Moreover, the purity of the lead thus obtained, at best 99.7%, is not sufficient for all purposes.

For this reason attempts have been made to find a different solution to the problem of treating used batteries and other similar scraps. British Pat. No. 1,385,957 discloses how lead is leached by means of an ammonium sulfate solution, from which the lead is recovered by causing the obtained solution to be absorbed into porous carbon and by burning the carbon, whereby the free lead is recovered in molten state. Although relatively pure lead is obtained by a simple method in this process, the disadvantages of the pyrometallurgical process have not been eliminated.

Other leaching processes are also known. In U.S. Pat. No. 3,689,235 the lead oxide and lead sulfate present in batteries is leached by means of a soda solution, from which it is dried and reduced into metallic lead as above with the aid of carbon.

The use of chlorides for the leaching of the said lead salts is described in British Pat. No. 456,807, in which the lead is leached to form a chloride and precipitated thereafter as a pure sulfate, and the chemicals used are regenerated. The obtained pure lead sulfate can obviously be reduced into pure lead by pyrometallurgical means, but the environmental hazards have not been eliminated. Hydrochloric acid is used for the leaching of lead-bearing metal salts and metal in the process described in Danish Pat. No. 131,309, in which, however, the lead is precipitated out of the solution by means of sulfides of other metals, and thus a pure lead salt is again obtained.

The use of chlorides for the leaching of lead sulfate and the removal of the sulfate from the solution by precipitation are described in German Pat. No. 72,804. However, a sulfate-free lead chloride, which is the prerequisite for economical electrolysis, is not obtained by this method. In the electrolysis, sulfate causes wearing of the graphite electrodes, increases the power requirement, and causes $SO_2$ formation.

German Pat. No. 343,345 and Swedish Pat. No. 49,441 describe methods of leaching lead from lead ores by chloride and sulfuric acid solutions. In both publications, however, the lead is reduced into metallic form by pyrometallurgical means.

German Pat. No. 429,667 describes as an improvement a two-stage leach for leaching the lead in chloride form; in the first stage a hot concentrated chloride solution is used for converting the lead compounds into lead chloride, and in the second stage of large amount of a colder chloride solution is used for causing the lead chloride to pass into the solution.

This process has the disadvantage that the amount of solution required for dissolving lead chloride at a low temperature is large and the precipitation of lead chloride becomes complicated. Furthermore, the concentrated solution of the first stage is diluted by the dilute solution of the second stage, and so the method cannot be applied to a process with a closed circulation of solution.

In the process according to the present invention all the above substantial disadvantages have been eliminated, and an especially pure lead can be produced by it.

Furthermore, it has been observed that, compared with conventional processes, the manufacturing costs are considerably lower when using the process according to the invention.

SUMMARY OF THE INVENTION

According to the present invention lead is recovered from battery scraps by mixing the lead scraps at elevated temperature with an aqueous solution of an alkali metal chloride and hydrochloric acid in order to dissolve, in the form of lead chloride, the lead compounds present in the lead scraps, separating an aqueous solution of this lead chloride from insoluble hard lead, which is recovered, crystallizing lead chloride from the cooling aqueous solution, which is separated from the lead chloride crystals, and finally subjecting the obtained lead chloride to electrolysis for the recovery of metallic lead.

DESCRIPTION OF THE DRAWING

The invention is described below in more detail with reference to the accompanying drawing, which shows diagrammatically the general flow of the process.

DESCRIPTION OF THE INVENTION

The discarded batteries are crushed 1, and the accumulator boxes, separators and other such materials with a lower density are separated from the lead parts in a water suspension with the aid of their different settling rates, which per se is conventional. The separated and crushed material containing lead, lead oxides, and lead sulfates is broken in an impact crusher or the like into suitably sized pieces for the leaching of the pulp and for the reactions occurring during the leach. The pieces are fed into a horizontal leaching reactor 2 provided with rotating mixer arms. Into the same reactor a solution consisting of aqueous solutions of NaCl and HCl is fed from the opposite direction. In the experiments performed, it has been observed that not nearly as good a leaching result is obtained with pure HCl or pure NaCl as with a mixture of the two. Futhermore, it has surprisingly been found that sulfuric acid greatly increases the leaching capacity. It has been observed that the best leaching solution is an aqueous solution containing hydrochloric acid approx. 80 g/l, sodium chloride approx. 160 g/l, and sulfuric acid approx. 20–70 g/l. Approx. 70°–80° C has been found to be the best leaching temperature. The $PbO_2$ present in the pulp is reduced in PbO, which dissolves as a chloro complex, and the $PbSO_4$ present in the pulp dissolves as a chloro complex and sulfuric acid. When it is reduced, $PbO_2$ releases chlorine. In this particular leaching process a large portion of the released chlorine can be used for oxidizing the surface of the metallic lead which is continuously exposed owing to the effective mechanical stirring; thus, more lead chloride is obtained.

The chlorine which has not reacted is directed from reactor 2 for burning 10 with hydrogen into hydrochloric acid, which is returned to the leach 2.

In a well performed leach 2 a concentration of at least 37 g/1 is obtained for the lead chloride, and 99% of the lead sulfate and lead oxide present in the pulp is dissolved. Moreover, part of the metallic lead present in the original pulp dissolves as lead chloride.

It has also been found surprisingly in the leach 2 described above that some cementation of the impurities dissolved on the surface of the exposed lead, i.e., metals nobler than lead, occurs in spite of the acid solution. Thereby a double advantage is simultaneously gained. The products thus obtained are a very pure lead chloride and an already metallic hard lead which is so rich in antimony, for example, that after melting 6 is is suitable for alloying.

Since the obtained lead chloride solution has a high concentration and the solubility of $PbCl_2$ is greatly dependent on the temperature most of the $PbCl_2$ can be precipitated 3 as very pure crystals by lowering the temperature to approx. 18° C, in which case approx. 84% of the lead present in it is in the precipitated crystals. The mother liquor from the crystallization is filtered and returned to the process circulation for further treatment.

The obtained $PbCl_2$ crystals are dried and smelted 4 with NaCl, KCl, or LiCl. Thereby a salt mixture with a low melting point is obtained, from which Pb can be electrolyzed 5 by a method known per se (US Bureau of Mines, TN 23.U7 no 7913-622.06173). The lead obtained from the molten salt electrolysis is very pure, 99,99%.

The mother liquor which is to be returned to the circulation of the process from the crystallization 3 and into which impurities, such as sulfuric acid and metallic impurities, have accumulated from the battery scraps is fed, before its return to the process, to a purifying treatment 7.

Bisulfate ions and sulfate ions can be extracted 7 very advantageously from the circulating solution by using, for example some water-insoluble tertiary amine, such as trioctyl amine, for the extraction. In particular, it has been observed in experiments that an extraction 7, performed by means of a rapid, effective contact, gives a better yield than a long contact terminating in a final equilibrium. For a reduction of the viscosity, and for a better clarification of the extraction dispersion, the reagent has been diluted with, for example, kerosene or xylene. Amines other than tertiary can also be used.

The obtained bisulfate solution of a tertiary or respective amine can be regenerated 8, 9 for a new extraction cycle by means of, for example, $Ca(OH)_2$, NaOH, or $NH_4OH$ plus CaCl, using the lastmentioned at the rate at which make-up chlorides are required in the process.

The metallic impurities in the mother liquor after the crystallization of $PbCl_2$ include $Fe^{3+}$, $Cu^{2+}$, $Sb^{3+}$ and $Sb^{5+}$, $Sn^{2+}$ and $Sn^{4+}$, $As^{3+}$ and $As^{5+}$, $Bi^{3+}$ and $Bi^{5+}$, $Ag^+$ and $Ni^{2+}$. Out of these, at least $Fe^{3+}$, $Ag^+$ and $Ni^{2+}$ pass to a high degree into the organic phase. The Cu, Sb and Bi ions cement on the surface of metallic lead during the leaching of the lead salts. During the said cementation, more pure lead is simultaneously dissolved in the solution.

The circulating solution purified by the methods described above is returned, after the make-up additions, to the battery scrap leach 2.

Chlorine is released both from the leach 2 and especially from the lead chloride electrolysis 5. This chlorine must be burned 10 back into hydrochloric acid so as to be again available in the process cycle.

The invention is described below in more detail by way of examples.

EXAMPLE 1

Leaching of $PbO_2$ and $PbSO_4$.

1 kg of battery scraps from which the boxes, separators, connectors and terminals had been removed was treated.

The composition of the remaining material was as follows:
Battery paste 544 = 54,4%
Metallic part 456 g = 45,6%
The composition of the battery paste was as follows:
Pb = 84,2%
$SO_4$ = 10,3%
Active $O_2$ (oxidizing $O_2$ present in $PbO_2$) 5,0%.
The rest of the paste was graphite and fiber that served as a bonding agent.

The paste described above was mixed with 14,3 l of a solution which contained NaCl 160 g/l $H_2O$ and HCl 80 g/l $H_2O$.

The solution was heated to 80° C and maintained at this temperature for 1 h. After this time it could be considered that all the soluble material from the battery paste had dissolved.

The chlorine gas released during the leach was recovered in 10 l of a 2 N NaOH solution, the $Cl_2$ concentration of which was determined to be 5,7 g/l. The chlorine yield obtained was 97,5%.

The concentrations in the strong chloride solution obtained from the leach were as follows at +80° C:
Pb 32 g/l
$SO_4$ 3,9 g/l
$Cl^-$ 169 g/l
$H^+$ 2,15 eqv./l
The obtained solution was filtered while hot in order to removed the solids present in it.

EXAMPLE 2

Crystallization of $PbCl_2$ out of the solution.

The Pb-bearing solution described in the above example was cooled slowly to +18° C, while stirring it all the time. Thereby most of the $pbCl_2$ present in the solution crystallized. The obtained crystals were filtered out and washed with 3 × 1,5 l of water at approx. +18° C.

The obtained crystals were dried and weighed. 456 g of PbCl$_2$ was obtained, and the crystallization yield was 84,2%.

The analysis of the washed and dried lead chloride was as follows:
Pb 86,5%
Cl$_2$ 13,2%
Na 0,012%
Other metallic impurities (Sb, Sn, Cu, Bi, As, Ni, Ag, Fe) in total 0,03%.

The obtained dried lead chloride was used for an electrolysis experiment according to the following example.

EXAMPLE 3

Electrolysis of PbCl$_2$ in salt melt.
The following salt mixture was prepared:
456 g PbCl$_2$ from an experiment according to the previous example
89 g KCl
25 g LiCl The mixture was homogenized by grinding it for 1 h in a ball mill. The obtained mixture was placed in a graphite crucible in which there were two rectangular graphite electrodes at a distance of 20 mm from each other.

The salt mixture was smelted and heated to +450° C. The surface area of each electrode in the melt was 13 cm$^2$. The melt was then electrolyzed with a current density of 0,775 A/Cm$^2$ for 7 h 20 min. The lead reduced on the cathode flowed in molten state to the bottom of the crucible. Chlorine gas was generated at the anode.

At the end of the electrolysis the obtained lead, cast into an ingot, was weighed. The ingot weighed 278,5 g. The efficiency of the current was $$(278.5 \times 100)/284 = 98\%$$

(284 g is the theoretical lead amount obtainable by the said amount of current).
The analysis of the obtained Pb product was:
Metallic impurities (Sb, Sn, Bi, As, Ag, Ni, Cu, Fe) in total 0,0039%. Na was not observed.
Pb (100,0000 − 0,0039) 99,996%

EXAMPLE 4

Purification of the mother liquor from the crystallization for a new solvent circulation.
(a) Removal of HSO$_4^-$
HSO$_4^-$ was removed by liquid extraction by using tri-n-octyl-/n-desylamine "Hostarex 327", manufacturer Hoechst, West Germany, diluted with xylene at a volume ratio 1:1. Before the extraction experiment the amine in OH$^-$ form was converted to chloride form by shaking it with an excess of 3-n HCl for 30 min. The extraction was performed at a phase ratio of 1:1. The SO$_4$ content in the feed (NaCl-H$_2$SO$_4$ solution from an experiment according to Example 2) was 20,0 g/l. For the sake of comparison an extraction experiment was also performed with amines "Amberlite La-1" (secondary amine, C$_{12}$-C$_{14}$, Rohm & Haas) and "Hostarex 324" (Tri-iso-octyl amine, Hoechst).
Results:

| Extracting chemical | Equilibrium period | SO$_4^=$ in organic phase |
|---|---|---|
| | | g/l |
| "Amberlite LA-1" | 20 min | 1,1 |
| "Hostarex 324" | 35 min | 1,9 |
| "Hostarex 327" | 35 min | 1,3 |
| "Hostarex 327" | 2 min | 10,3 |

(b) Removal of metallic impurities
1 l of the solution obtained from the sulfate ion removal according to the above experiment was mixed for ½ h at 80° C with 50 g of lead chips. The following analyses were made of the solution (results in mg/l):

| | Sb | As | Sn | Bi | Cu | Ni | Ag | Fe | Total |
|---|---|---|---|---|---|---|---|---|---|
| Before | 14,5 | 10,0 | 4,6 | 25,0 | 0,34 | 0,17 | 0.06 | 0,8 | 55,5 |
| After | 5,0 | 0,6 | 6,2 | 2,1 | 0,13 | 0,05 | 0,015 | 0,8 | 14,3 |

Thus, 74,2 % of the impurities had been removed by the cementation process.

What is claimed is:

1. A process for the recovery of lead from lead scraps such as battery scraps, comprising mixing the lead scraps at elevated temperature with an aqueous solution of an alkali metal chloride and hydrochloric acid; separating the aqueous solution containing dissolved lead chloride from insoluble hard lead, which is recovered; crystallizing the lead chloride from the cooling aqueous solution, which is separated from the lead chloride crystals; and finally subjecting the obtained lead chloride to an electrolysis for the recovery of metallic lead by a method known per se.

2. The process according to claim 1, in which the lead scraps are mixed at elevated temperature with an aqueous solution of alkali metal chloride, hydrochloric acid, and sulfuric acid.

3. The process according to claim 1, in which the lead scraps are mixed at elevated temperature with an aqueous solution which contains alkali metal chloride in an amount of 100–300 g/l and hydrochloric acid in an amount of 25–150 g/l.

4. The process according to claim 1, in which the alkali metal chloride used is sodium chloride.

5. The process according to claim 1, in which the lead scraps are stirred at 40°–120° C.

6. The process according to claim 1, in which the lead scraps are stirred so vigorously with the aqueous solution that fresh surface of metallic lead is continuously exposed and metals nobler than lead, present in the aqueous solution, are cemented on the metallic surface.

7. The process according to claim 1, in which the chlorine gas released during the leach of the lead compounds is burned together with hydrogen into hydrogen chloride, which is recycled to the leach.

8. The process according to claim 1, in which the obtained lead chloride crystals are smelted together with sodium, potassium or lithium chloride or a mixture thereof to a conductive salt mixture with a low melting point, from which the lead is recovered by electrolysis.

9. The process according to claim 1, in which the chlorine gas released in the lead chloride electrolysis is burned together with hydrogen into hydrogen chloride, which is recycled to the leach of lead compounds.

10. The process according to claim 1, in which the mother liquor separated from the lead chloride is subjected to extraction with a water-insoluble organic amine.

11. The process according to claim 10, in which the bisulfate and sulfate ions are stripped, by means of an aqueous solution of an aqueous solution of a chloride salt, from an organic alkyl amine obtained from the extraction.

12. The process according to claim 10, in which the extraction is performed with a short contact period of 10–300 sec.

13. The process according to claim 10, in which the organic amine has been dissolved in kerosene or xylene.

14. The process according to claim 11, in which sodium chloride or calcium chloride is added to the stripping solution.

15. The process according to claim 14, in which calcium hydroxide, sodium hydroxide, or ammonium hydroxide is added to the stripping solution in order to precipitate and separate excess sulfate from the stripping solution.

16. The process according to claim 10, in which the purified aqueous solution from the extraction is recycled to the leach of the lead compounds.

17. The process according to claim 1, in which metals nobler than lead, present as impurities, are cemented on the surface of metallic lead that is in contact with the aqueous solution.

18. The process according to claim 1, in which the current density in the electrolysis is raised either periodically or permanently in one cell over 1,5-fold compared with the normal value, then the impurities reduced by the electrolysis are removed together with the product lead.

* * * * *

UNITED STATES PATENT AND TRADEMARK OFFICE
CERTIFICATE OF CORRECTION

PATENT NO. : 4,096,045
DATED : June 20, 1978
INVENTOR(S) : Heikki Ahonen; Jari Lindroos; Veli Sarkkinen and Reijo Seppanen It is certified that error appears in the above—identified patent and that said Letters Patent are hereby corrected as shown below:

--Reijo Seppanen, of Bredantie, Finland-- in listing of inventors.

Signed and Sealed this

Fifteenth Day of May 1979

[SEAL]

Attest:

RUTH C. MASON
Attesting Officer

DONALD W. BANNER
Commissioner of Patents and Trademarks